(No Model.)
J. L. DEAN.
DEVICE FOR BINDING CORN SHOCKS, &c.
No. 547,000. Patented Oct. 1, 1895.
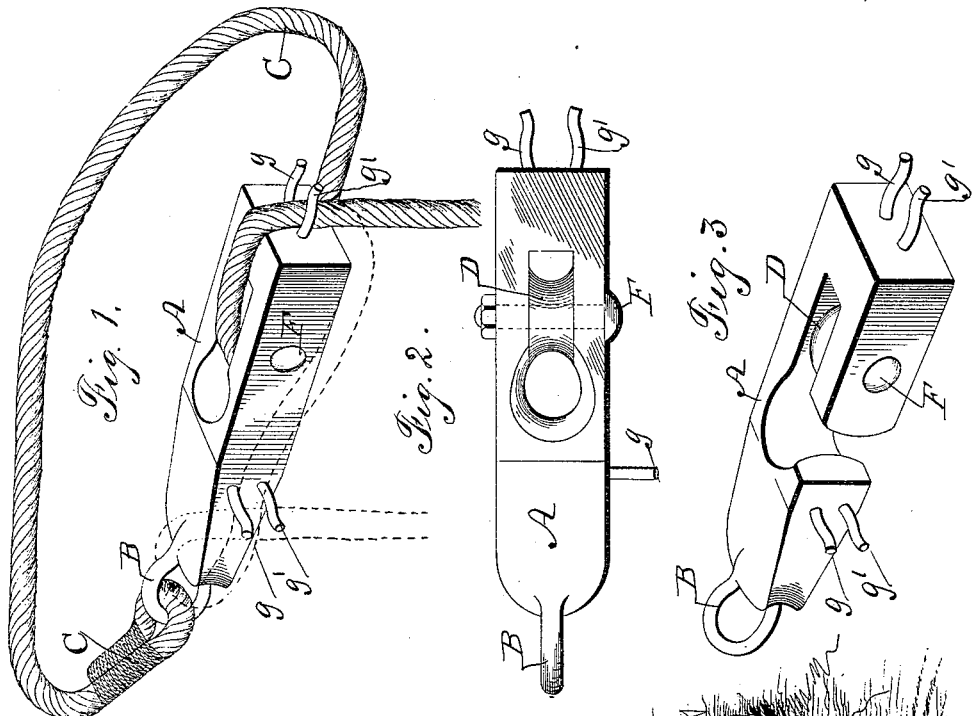
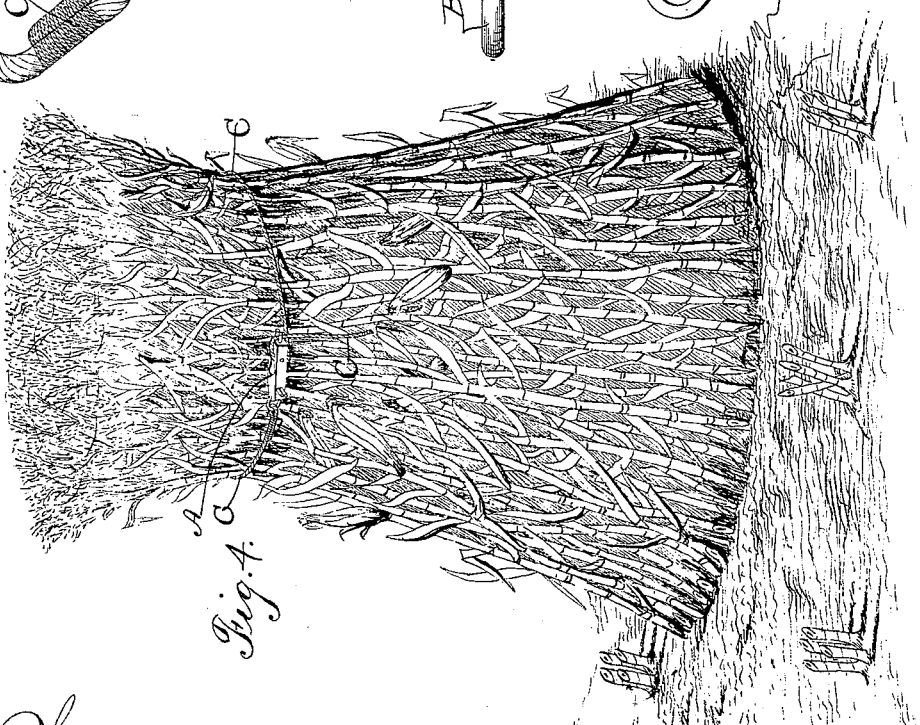

UNITED STATES PATENT OFFICE.

JOHN L. DEAN, OF WINTERSET, IOWA.

DEVICE FOR BINDING CORN-SHOCKS, &c.

SPECIFICATION forming part of Letters Patent No. 547,000, dated October 1, 1895.

Application filed October 2, 1894. Serial No. 524,703. (No model.)

*To all whom it may concern:*

Be it known that I, JOHN L. DEAN, a citizen of the United States of America, residing at Winterset, in the county of Madison and State of Iowa, have invented a new and useful Device for Binding Corn-Shocks, &c., of which the following is a specification.

My object is to facilitate the manual labor required to bind shocks of corn and other grain crops cut from the ground; and my invention consists in a device adapted to be placed around a shock and to draw the stalks together and to hold them compactly gathered at their top end portions until a band, made of straw or other suitable material, is fixed around the shock to remain there while the shock stands in the field and also when loaded on a wagon.

In the accompanying drawings, Figure 1 is a perspective view of my device. Fig. 2 is a top view of the block from which the rope is detached. Fig. 3 is a perspective view showing an opening in the side of the block adapted for passing a rope in and out of a central slot in the block and on and off a pulley in the central slot. Fig. 4 is a perspective view showing my device applied to a shock of corn, as required in practical use.

A represents a block made of hard wood or metal and that may vary in size, as desired. It has an eye B, formed on or fixed to one end, that is adapted for connecting a rope C therewith. It also has a central longitudinal slot, within which slot is pivoted a pulley D by means of a bolt F or in any suitable way, so as to allow the rope C to be extended through the slot and over the pulley, and from thence to a rope-holder at the end of the block.

$g$ and $g'$ represent a rope-holder in the form of two pins fixed to the end of the block A in such a manner that when the rope B is drawn in between them the rope will be clamped fast to the block by means of the pins. A corresponding rope holder or clamp is fixed to the side of the block A, so that the rope can be fastened to the block at two distinct places after it has been passed around a shock of grain. One end of the slot in the block A, within which the pulley D is mounted, is rounded and enlarged to facilitate the introduction and passage of the free end of the rope C.

In the practical use of my invention, I retain the free-end portion of the rope C in my hand and sling the block A around the top portion of a shock and then seize the block and pass the free end of the rope through the slot in the block and over the pulley D, and when the device is thus placed around the shock I pull upon the free end of the rope and draw it taut and then fasten it to the block by means of the pins $g$ and $g'$, so that my hands are relieved from holding the rope or the shock and free to fix a band around the shock, and when a shock is thus advantageously compressed and held and bound I detach my device and am ready to bind another.

It is obvious that much of the labor and difficulty of drawing and holding together the stalks of a shock of grain of any kind, preparatory to binding them together, may be overcome by the use of my invention, and that the practical operation and utility of the device will be readily understood by farmers and others familiar with shocking grain.

I claim as my invention—

A device for binding grain consisting of the block A having an eye B at one end and a central slot and a pulley D mounted in the slot, and fixed pins $g$ and $g'$ extending laterally from the block near one end of the slot and corresponding pins projecting outward from the end of the block, and a rope C fixed to the eye B and adapted to be extended through the slot in the block and over the pulley therein, and detachably fastened to the block by means of said pins, substantially as shown and described.

JOHN L. DEAN.

Witnesses:
F. P. HARTSOOK,
W. H. JONES.